US010641658B1

(12) United States Patent
Yu

(10) Patent No.: US 10,641,658 B1
(45) Date of Patent: May 5, 2020

(54) METHOD AND SYSTEM FOR HYPERSPECTRAL LIGHT FIELD IMAGING

(71) Applicant: SHANGHAITECH UNIVERSITY, Shanghai (CN)

(72) Inventor: Jingyi Yu, Shanghai (CN)

(73) Assignee: ShanghaiTech University, Shanghai (CN)

( * ) Notice: Subject to any disclaimer, the term of this patent is extended or adjusted under 35 U.S.C. 154(b) by 0 days.

(21) Appl. No.: 16/678,104

(22) Filed: Nov. 8, 2019

Related U.S. Application Data

(63) Continuation of application No. PCT/CN2017/087210, filed on Jun. 5, 2017.

(51) Int. Cl.
*G01J 3/28* (2006.01)
*G06K 9/46* (2006.01)
*G06K 9/62* (2006.01)
*G06K 9/00* (2006.01)
*H04N 13/271* (2018.01)
*G06T 7/557* (2017.01)

(52) U.S. Cl.
CPC .......... *G01J 3/2823* (2013.01); *G06K 9/0063* (2013.01); *G06K 9/4642* (2013.01); *G06K 9/6212* (2013.01); *G06T 7/557* (2017.01); *H04N 13/271* (2018.05); *G01J 2003/2826* (2013.01); *G06K 2009/00644* (2013.01); *G06T 2207/10036* (2013.01)

(58) Field of Classification Search
None
See application file for complete search history.

(56) References Cited

U.S. PATENT DOCUMENTS

| 2011/0012995 | A1  | 1/2011 | Watanabe et al. |
| 2013/0038701 | A1  | 2/2013 | Hung et al. |
| 2015/0177429 | A1  | 6/2015 | Darty |
| 2016/0248987 | A1  | 8/2016 | Zilly et al. |
| 2016/0278678 | A1* | 9/2016 | Valdes ............... A61B 5/14556 |

FOREIGN PATENT DOCUMENTS

CN          105424186 A       3/2016

OTHER PUBLICATIONS

PCT International Search Report and the Written Opinion dated Feb. 24, 2018, issued in corresponding International Application No. PCT/CN2017/087210 (9 pages).

* cited by examiner

*Primary Examiner* — David Perlman
(74) *Attorney, Agent, or Firm* — Sheppard Mullin Richter & Hampton LLP

(57) ABSTRACT

A method for generating hyperspectral data-cubes based on a plurality of hyperspectral light field (H-LF) images is disclosed. Each H-LF image may have a different view and a different spectral band. The method may include calculating a magnitude histogram, a direction histogram, and an overlapping histogram of oriented gradient for a plurality of pixels; developing a spectral-invariant feature descriptor by combining the magnitude histogram, the direction histogram, and the overlapping histogram of oriented gradient; obtaining a correspondence cost of the H-LF images based on the spectral-invariable feature descriptor; performing H-LF stereo matching on the H-LF images to obtain a disparity map of a reference view; and generating hyperspectral data-cubes by using the disparity map of the reference view. A bin in the overlapping histogram of oriented gradient may comprise overlapping ranges of directions.

23 Claims, 9 Drawing Sheets

US 10,641,658 B1

METHOD AND SYSTEM FOR HYPERSPECTRAL LIGHT FIELD IMAGING

CROSS-REFERENCE TO RELATED APPLICATION

This application is a continuation application of International Patent Application No. PCT/CN2017/087210, filed on Jun. 5, 2017 and entitled "METHOD AND SYSTEM FOR HYPERSPECTRAL LIGHT FIELD IMAGING." The above-referenced application is incorporated herein by reference in its entirety.

TECHNICAL FIELD

The disclosure relates generally to hyperspectral light field imaging system for generating hyperspectral light field images, and more particularly, to method and system for generating complete hyperspectral data-cubes from captured hyperspectral light field images.

BACKGROUND

Hyperspectral light field (H-LF) imaging is part of a class of techniques commonly referred to as spectral imaging or spectral analysis. The H-LF imaging collects and processes information from across the electromagnetic spectrum. A hyperspectral camera/sensor collects information as a set of H-LF images. Each image represents a narrow wavelength range of the electromagnetic spectrum, also known as a spectral band. These images are combined to form a hyperspectral data-cube for processing and analysis. The goal of H-LF imaging is to obtain the spectrum for each pixel in the image of a scene with narrow spectral bands over a continuous spectral range. Every pixel in the image thus can be used to characterize the objects in the scene with great precision and detail.

The H-LF images provide much more detailed information about the scene than a normal color camera. The H-LF imaging leads to a vastly improved ability to classify the objects in the scene based on their spectral properties. It can also take advantages of the spatial relationships among the different neighboring spectra, allowing more elaborate spectral-spatial models for a more accurate segmentation and classification of the image.

In this disclosure, we present a new method for generating complete hyperspectral data-cubes from captured H-LF images.

SUMMARY

One aspect of the present disclosure is directed to a method for generating hyperspectral data-cubes based on a plurality of hyperspectral light field (H-LF) images. Each H-LF image may have a different view and a different spectral band. The method may include calculating a magnitude histogram, a direction histogram, and an overlapping histogram of oriented gradient for a plurality of pixels; developing a spectral-invariant feature descriptor by combining the magnitude histogram, the direction histogram, and the overlapping histogram of oriented gradient; obtaining a correspondence cost of the H-LF images based on the spectral-invariable feature descriptor; performing H-LF stereo matching on the H-LF images to obtain a disparity map of a reference view; and generating hyperspectral data-cubes by using the disparity map of the reference view. A bin in the overlapping histogram of oriented gradient may comprise overlapping ranges of directions.

Another aspect of the present disclosure is directed to a method for generating hyperspectral data-cubes based on a plurality of hyperspectral light field (H-LF) images. Each H-LF image may have a different view and a different spectral band. The method may include obtaining an estimated spectra by synthesizing RGB color values from the H-LF images and mapping the RGB color values to a spectral band; obtaining a defocus cost of the H-LF images based on a comparison between estimated spectra and captured spectra of the H-LF images; performing H-LF stereo matching on the H-LF images to obtain a disparity map of a reference view; and generating hyperspectral data-cubes by using the disparity map of the reference view.

Another aspect of the present disclosure is directed to a hyperspectral light field imaging (HLFI) system for capturing hyperspectral light field (H-LF) images to generate hyperspectral data-cubes. The system may include a plurality of multi-view hyperspectral data terminals and a data processing unit. The terminals may be configured to capture a plurality of H-LF images, and each image may have a view and a different spectral band. The data processing unit may be configured to calculate a magnitude histogram, a direction histogram, and an overlapping histogram of oriented gradient for a plurality of pixels; develop a spectral-invariant feature descriptor by combining the magnitude histogram, the direction histogram, and the overlapping histogram of oriented gradient; obtain a correspondence cost of the H-LF images based on the spectral-invariable feature descriptor; perform H-LF stereo matching on the H-LF images to obtain a disparity map of a reference view; and generate hyperspectral data-cubes by using the disparity map of the reference view.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several non-limiting embodiments and, together with the description, serve to explain the disclosed principles.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

In accordance to embodiments of the present disclosure, a hyperspectral light field imaging (HLFI) system including a data capturing unit, a data processing unit and a data displaying unit is provided. The data capturing unit captures a plurality of multi-view H-LF images, which are the sampled H-LF images. The sampled H-LF images are transmitted to the data processing unit. The data processing unit preprocess the sampled H-LF images to obtain rectified and undistorted H-LF images, and performs H-LF stereo matching to obtain a disparity map of a reference view. Then the data processing unit generates complete hyperspectral data-cubes based on the disparity map. The complete hyperspectral data-cubes are transmitted to the data displaying unit for displaying.

In some embodiments, the sampled H-LF images are 5×6 H-LF images. Each image is captured at a different view, and samples a different spectrum range with a bandwidth of 10 nm. The total spectra of the 30 H-LF images cover the whole visible spectrum band from 410 nm to 700 nm. In some embodiments, the complete H-LF data-cubes include all 5×6 views and 5×6×30 images, where 30 is the number of sampled spectrum bands. The complete H-LF data-cubes cover the spectrum range from 410 to 700 nm with 30 bands each 10 nm wide.

1. System Overview

Figure 1:
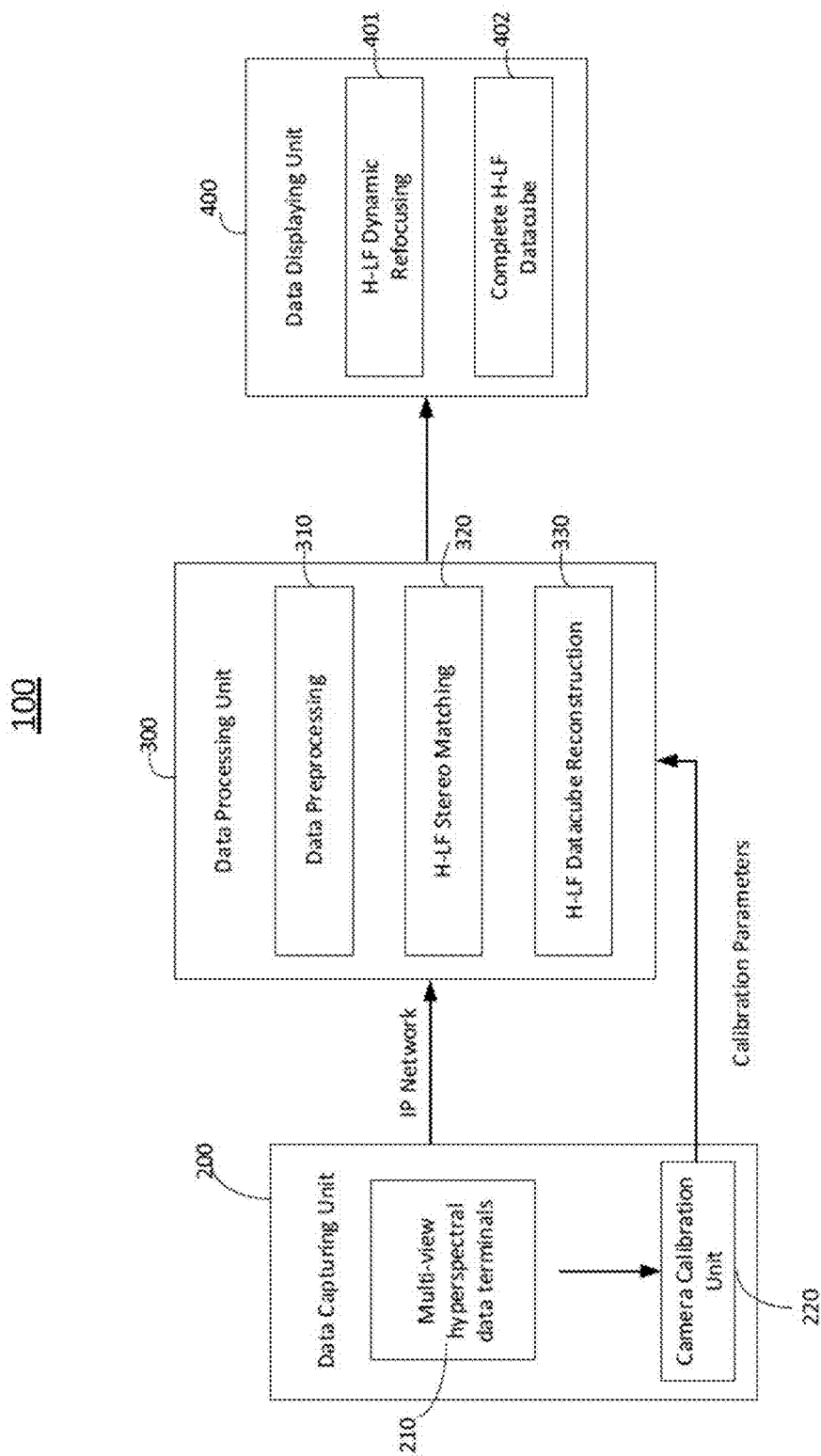
FIG. 1 is a schematic diagram for a hyperspectral light field imaging (HLFI) system, consistent with exemplary embodiments of the present disclosure.

FIG. 1 shows an exemplary HLFI system 100 in accordance to an embodiment of the present disclosure. The system 100 may include a number of components, some of which may be optional. In some embodiments, the system 100 may include many more components than those shown in FIG. 1. However, it is not necessary that all of these components be shown in order to disclose an illustrative embodiment.

As shown in FIG. 1, the system 100 may include a data capturing unit 200, a data processing unit 300 and a data displaying unit 400. The data capturing unit 200 may include a plurality of multi-view hyperspectral data terminals 210, and a camera calibration unit 220. The data processing unit 300 may include a data preprocessing unit 310, an H-LF stereo matching unit 320, and an H-LF data-cube reconstruction unit 330. The data displaying unit 400 may include an H-LF dynamic refocusing unit 401 and a complete H-LF data-cube unit 402.

2. Data Capturing Unit

As shown in FIG. 1, the data capture unit 200 may include a plurality of multi-view hyperspectral data terminals 210, and a camera calibration unit 220.

2.1 Hyperspectral Data Terminals

Figure 2A:
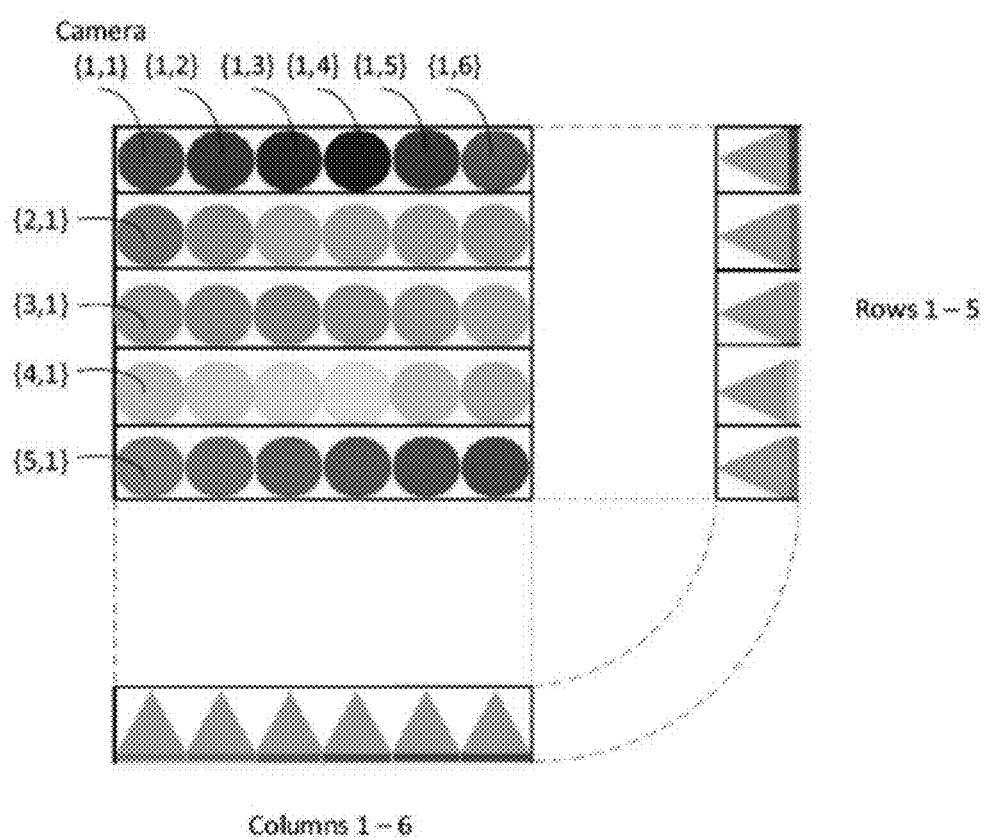
FIGS. 2A and 2B are graphical representations illustrating a data capturing unit of an HLFI system, consistent with exemplary embodiments of the present disclosure.
Figure 2B:
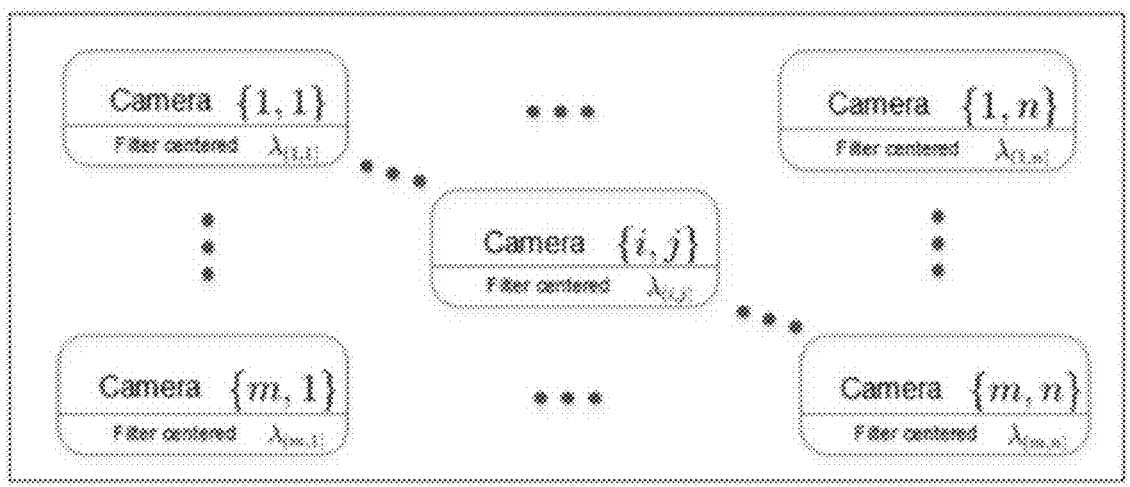

FIGS. 2A and 2B are graphical representations illustrating the plurality of multi-view hyperspectral data terminals 210, in accordance to an embodiment of the present disclosure. In some embodiments, the terminals 210 may be placed in a rectangular array with κ rows and 6 columns. Positions of each terminal 210 can be denoted as {i, j}, where i stands for the row number, and j stands for the column number. As shown in FIG. 2A, the terminals 210 in each row are equally spaced on an identical plate. All rows may be uniformly fixed on a common limit bracket which ensures that each terminal can have same baselines with its neighboring terminals within the limits of installation accuracy and techniques. A baseline is a distance between adjacent terminals/cameras in pixel, usually measured in unit of mm.

Each of the terminals 210 may consist of a monochrome camera and a narrow bandpass optical filter. Each filter may be centered on a specific wavelength with a bandwidth of 10 nm, and the minimum wavelength is 410 nm and the maximum wavelength is 700 nm. All 5×6 filters can sample the whole visible spectrum band from 410 nm to 700 nm, with intervals of 10 nm. In other words, the terminals 210 may capture 5×6 H-LF images. Each image samples a different spectrum range with a bandwidth of 10 nm, and the total spectra of the 30 H-LF images cover the whole visible spectrum band from 410 nm to 700 nm. These 30 H-LF images are sampled H-LF images for generating complete hyperspectral data-cubes in this disclosure. Table 1 lists parameters of hyperspectral data terminal array.

TABLE 1

| Sensors | |
| --- | --- |
| Sensor Type | CCD |
| Sensor Size | ⅓" inch |
| Pixel Size | 3.75 μm × 3.75 μm |
| Resolution | 1292 × 964 |
| Frame Rate | 30 fps |
| Image Data Format | Mono8 |
| Data Interface | Gigabit Ethernet (1000 Mbit/s) |
| Synchronous Mode | External/Software Trigger |
| Lens | |
| Focal Length | 8 mm |
| Aperture Range (F-Stop) | F1.4-F16C |
| Filters | |
| Range of wavelength | 410 nm-700 nm |
| Steps | 10 nm |
| Number of band | 30 bands |

2.2 Multi-Camera Calibration

Cameras in the multi-view hyperspectral data terminals 210 may include intrinsic, extrinsic and distortion parameters. The intrinsic parameters refer to the parameters to link pixel coordinates of an image point with the corresponding coordinates in a camera reference. The extrinsic parameters may define a location and orientation of the camera reference frame with respect to a known world reference frame. The distortion parameters may be caused due to the limitation of lens production technology and imaging models. The intrinsic, extrinsic and distortion parameters are used to rectify the captured hyperspectral images.

At the camera calibration unit 220, the intrinsic, extrinsic and distortion parameters are obtained. In some embodiments, a camera calibration method from Zhengyou Zhang (Z. Zhang, "A flexible new technique for camera calibration", *IEEE Trans. Pattern Anal. Mach. Intell.*, 22(11):1330-1334, 2000) may be applied to obtain above-mentioned parameters. To obtain the intrinsic and distortion parameters, all cameras are first refocused on a same plane with a similar aperture condition, then Zhengyou Zhang's method is applied with the use of Matlab platform. The extrinsic parameters can be obtained by applying Zhengyou Zhang's method to obtain parameters of rotation and translation between each neighboring pair of cameras.

Based on the intrinsic, extrinsic and distortion parameters, a multi-view rectification method for the sampled H-LF images can be developed. Since all cameras' views cover largely the same area, the cameras do not need to be calibrated one by one. Instead, we can calibrate the cameras by guaranteeing a checkerboard in all cameras' views simultaneously when capturing images synchronously. A "checkerboard" is a geometric pattern commonly used in camera calibration. In addition, due to different spectral responses of the filters on the cameras, a suited exposure setting is determined to ensure all cameras can capture the contrast of the pattern of the checkerboard simultaneously.

2.3. H-LF Image Capturing Method

The plurality of multi-view hyperspectral data terminals 210 capture H-LF images and send them to the data processing unit 300 via an IP network. Due to the size of the hyperspectral data and the limitation of transmission bandwidth, the data processing unit 300 may not obtain all data simultaneously. In some embodiments, software may be developed to ensure that the data of the captured H-LF images from all cameras (5×6) can be transmitted synchronously to the data processing unit 300. A data buffer queue may be built on each camera, and all the data are transmitted with a time-shared mode, so that the H-LF images are captured synchronously by terminals 210 with an external trigger. In addition, due to different spectral responses of filters on the cameras, for each scene, the terminals 210 are configured to capture the H-LF images in multiple exposures with different camera exposure settings, so that the terminals 210 can capture more details before overexposure.

3. Data Processing Unit

As shown in FIG. 1, the data processing unit 300 includes a data preprocessing unit 310, an H-LF stereo matching unit 320 and an H-LF data-cube reconstruction unit 330.

Figure 3:
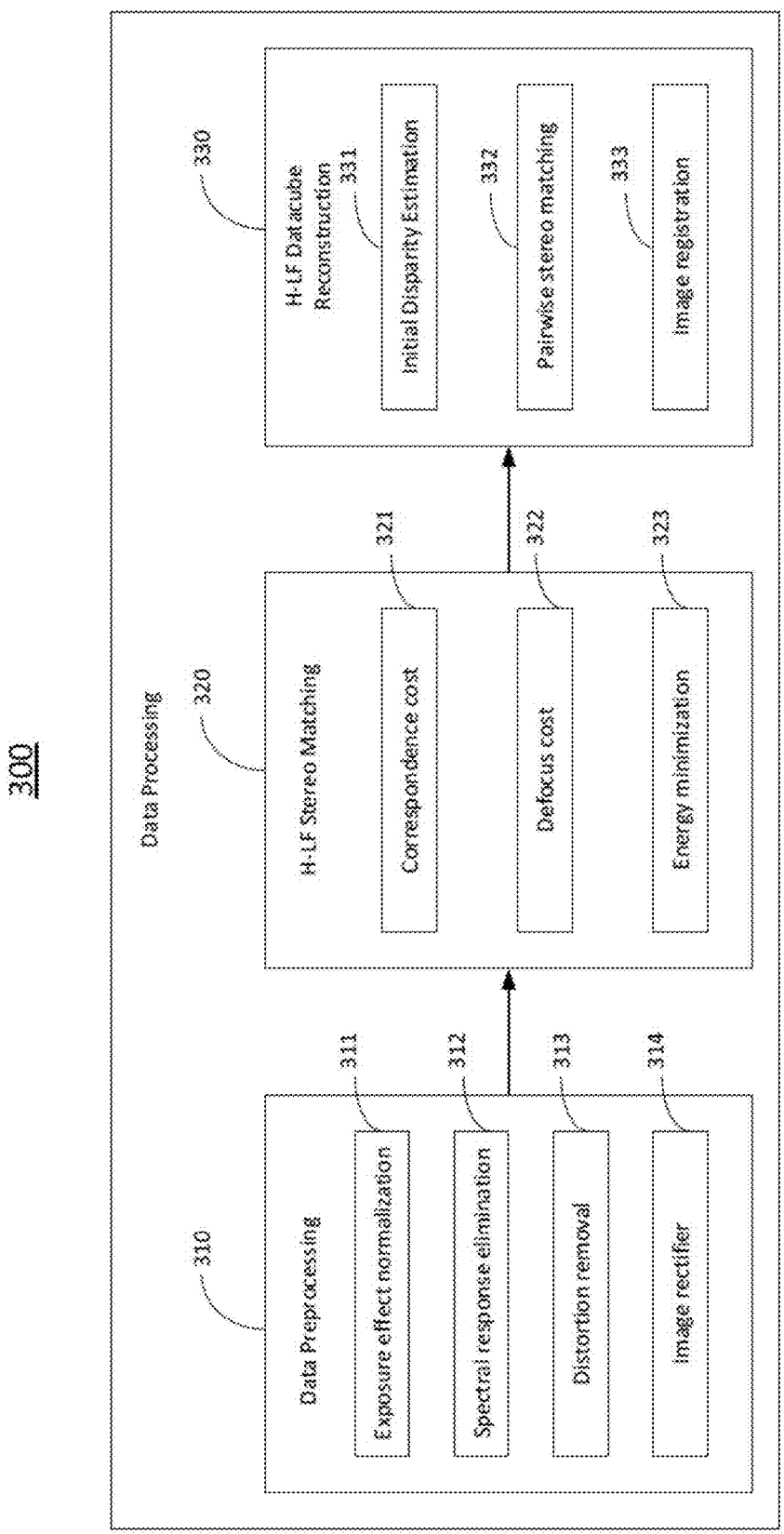
FIG. 3 is a graphical representation illustrating a data processing unit of an HLFI system, consistent with exemplary embodiments of the present disclosure.

FIG. 3 is a graphical representation illustrating a data processing unit 300 of an HLFI system in accordance to exemplary embodiments of the present disclosure. As shown in FIG. 3, the data preprocessing unit 310 may include an exposure effect normalization unit 311 for eliminating effects of different exposure settings, a spectral response elimination unit 312 for eliminating cameras' spectral responses, a distortion removal unit 313 for removing view distortions and an image rectifier 314 for rectifying the hyperspectral images. The data preprocessing unit 310 outputs rectified and undistorted hyperspectral images to the H-LF stereo matching unit 320.

The H-LF stereo matching unit 320 may include a correspondence cost unit 321 for measuring similarity of corresponding pixels, a defocus cost unit 322 for measuring unreliable color/intensity variance, and an energy minimization unit 323 for generating a disparity map of a reference view. The H-LF stereo matching unit 320 outputs a disparity map of a reference view to the H-LF data-cube reconstruction unit 330.

The H-LF data-cube reconstruction unit 330 may include an initial disparity estimation unit 331 for an initial disparity estimation, a pairwise stereo matching unit 332 for obtaining disparity maps between neighboring views, and an image registration unit 333 for generating complete hyperspectral data-cubes. The data processing unit 300 outputs the complete hyperspectral data-cubes and transmits them to the data displaying unit 400 for display.

3.1 Image Preprocessing

During data capturing, the camera in each multi-view hyperspectral data terminal captures a plurality of images with different exposure settings. At the exposure effect normalization unit 311, the effect caused by different exposure settings from each camera is eliminated. Among the plurality of images captured by each camera with different exposure settings, by measuring the quality of images, the image that has the highest sensitivity and is not overexposed is chosen as an established data of the particular camera. The established data of the camera is used for the rest of data processing. For example, each camera may capture 5 images with α different exposure settings. For camera $\{i, j\}$, its $3^{rd}$ image has the highest sensitivity among the 5 images, and the $3^{rd}$ image is not overexposed. Then, the $3^{rd}$ image is chosen as the established data of camera $\{i, j\}$ for the rest of the data processing.

Then at the spectral response elimination unit 312, we use the normalized image data as input for processing to eliminate the effect of camera's spectral response but still make the image depend on the spectrum.

Next, at the distortion removal unit 313, the images are warped in accordance to the distortion parameters to obtain images free of distortion. To improve accuracy, digital filters are used for signal de-noising.

Finally, at the image rectifier 314, by using the intrinsic and extrinsic parameters obtained from the camera calibration unit 220, all images can be rectified with two rules: (1) performing horizontal alignments for images in the same row; (2) performing vertical alignments for images in the same column. In computer vision theory, multi-view rectification is an ill-posed problem as opposed to a well-posed problem. A well-posed problem is considered as a mathematical model of a physical phenomenon that has the following properties: 1. a solution exists; 2. the solution is unique; and 3. the solution's behavior changes continuously with initial conditions. To solve the multi-view rectification problem, a nonlinear optimization method is applied to a sampling pattern which is selected to cover as much spatial position in a field of view as possible. Then a set of alignment parameters of all cameras can be obtained and used in rectifying the images.

The data preprocessing unit 310 outputs 5×6 preprocessed H-LF images which are rectified and undistorted. The preprocessed H-LF images cover the spectrum range from 410 to 700 nm with 30 bands each 10 nm wide. Each of the 30 images captures a different view.

3.2 H-LF Stereo Matching

The rectified and undistorted hyperspectral images are input to the H-LF stereo matching unit 320. The output of the H-LF stereo matching is an optimal disparity map of a reference view. In this disclosure, the reference view is chosen as the image captured by the camera positioned at $\{3, 4\}$ in the terminal array. As shown in FIG. 3, the H-LF stereo matching unit 320 may include a correspondence cost unit 321 for measuring similarity of corresponding pixels, a defocus cost unit 322 for measuring unreliable color/intensity variance, and an energy minimization unit 323 for generating an optimal disparity map.

Stereo matching works by finding corresponding points in rectified images. Approaches to the correspondence problem can be broadly classified into two categories: the intensity-based matching and the feature-based matching techniques. In the first category, the matching process is applied directly to the intensity profiles of the two images, while in the second, features are first extracted from the images and the matching process is applied to the features. The H-LF stereo matching is quite different from traditional stereo matching due to the color/intensity inconsistency. Images at different spectra have very different appearances, and the tradition stereo matching methods fail to match the correspondence points. To perform an accurate H-LF stereo matching, a new type of feature descriptor that is applicable in different spectra is of desire. A feature descriptor is a type of feature representation chosen to stand for a feature in image processing. In this disclosure, a new method for H-LF stereo matching with a new spectral-invariant feature descriptor is presented and shown in FIGS. 4A and 4B in accordance to exemplary embodiments of the present disclosure.

Figure 4A:
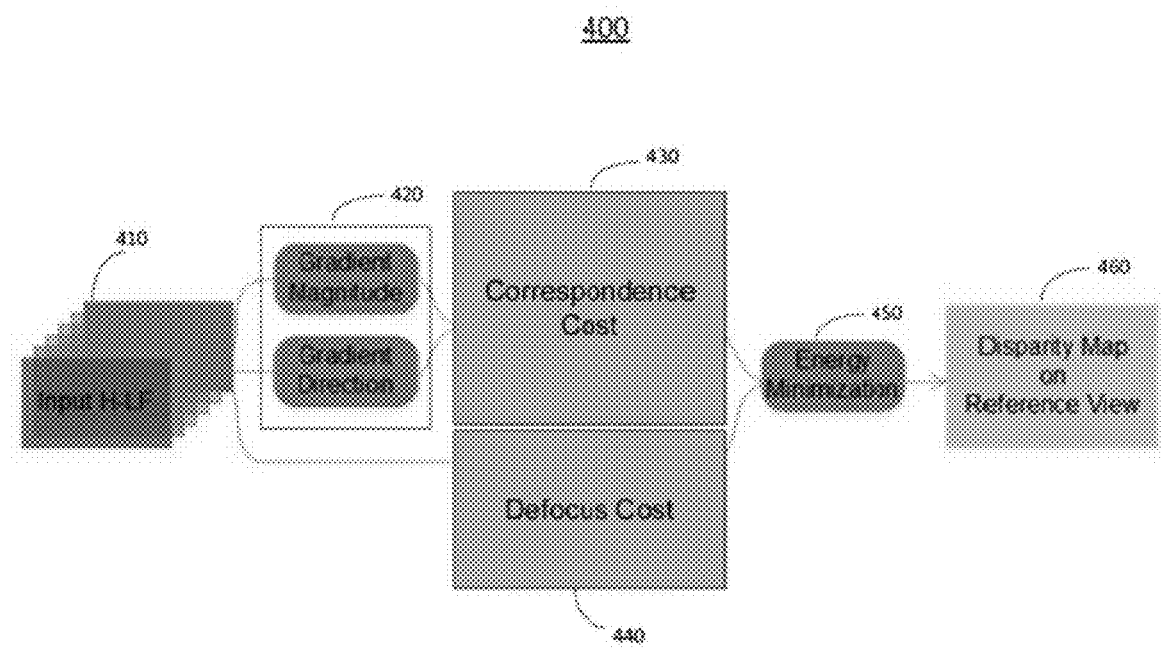
FIG. 4A is a diagram illustrating a method for H-LF stereo matching, consistent with exemplary embodiments of the present disclosure.

As shown in FIG. 4A, at step 410, the preprocessed images are input to the H-LF stereo matching unit 320. The input consists 30 H-LF images, which covers the visible spectrum range from 410 nm to 700 nm with intervals of 10 nm. At step 420, both gradient magnitude and gradient direction of each image are obtained. At step 430, a correspondence cost is obtained for measuring appearance consistency. At step 440, a new spectrum-aware defocus cost for measuring the unreliable color/intensity variance is obtained. At step 450, an energy function is constructed by integrating the correspondence cost and the defocus cost are integrated with additional occlusion and smoothness terms. Finally, at step 460, an optimal disparity map of a reference view (positioned at {3, 4}) is obtained. The detailed method for H-LF stereo matching is discussed in the following.

3.2.1 H-LF Image Formulation

A light ray can be mathematically formulated in ray space, and plane parameterization (2PP) is adopted for its simplicity. In 2PP, each ray is parameterized by its intersections with two parallel planes $\Pi_{uv}$ and $\Pi_{st}$. A light field includes an extra dimension, i.e., spectral dimension, and the 2PP representation can be modified as $L(u, v, s, t, \lambda)$ to represent the hyperspectral light field, where $(u, v)$ and $(s, t)$ are used to represent the ray intersections with the aperture and the sensor planes respectively at wavelength $\lambda$. An image $I(s, t, \lambda_i)$ on $(s, t)$ responding along a narrow bandpass spectral profile $F_{\lambda_i}(\Delta)$ which is centered at wavelength $\lambda_i$ can be formulated as:

$$I(s,t,\lambda_i) = \iiint L(u,v,s,t,\lambda) A(u,v) C(\lambda) \cdot F_{\lambda_i}(\lambda) \cos^4\theta \, d\lambda \, du \, dv$$

where $A(u, v)$ is the aperture function, and $\theta$ is an incident angle of the ray, $C(\lambda)$ is the camera's spectral response function. The spectral profile $F_{\lambda_i}(\lambda)$ can be approximated by a Dirac delta function $F_{\lambda_i}(\lambda) = \delta(\lambda - \lambda_i)$ and $\cos^4\theta$ can be ignored with a paraxial approximation. Thus, the above formulation can be simplified as:

$$I(s,t,\lambda_i) = C(\lambda_i) \iint L(u,v,s,t,\lambda_i) A(u,v) \, du \, dv = C(\lambda_i) S(s,t,\lambda_i)$$

where $S(\lambda_i)$ is a latent radiance image at spectrum $\lambda_i$, and $C(\lambda_i)$ is the spectral response function.

3.2.2 Preprocessing

As previously discussed, at the spectral response elimination unit 312, the effect caused by the cameras' spectral responses are eliminated, and this step can also be presented in a mathematical formulation. Considering a pixel $p \in \mathbb{N}^2$, for an image $I(p) = C(\lambda) S_p(\lambda)$ as presented in the above equation, it can be normalized as:

$$\tilde{I}(p) = \frac{I(p)}{\bar{I}} = \frac{S_p(\lambda)}{\bar{S}(\lambda)}$$

where $\bar{I}$ is a mean intensity and $\bar{S}(\lambda)$ is an average radiance in the image. We can use $\tilde{I}(p)$ as the input data for data processing, so that the effect from cameras' spectral responses can be eliminated, while the images still depend on the spectrum.

In addition, the gradient magnitude and gradient direction of each H-LF image can be calculated, and represented as: the gradient magnitude:

$$M(p) = \sqrt{\nabla_x \tilde{I}(p)^2 + \nabla_y \tilde{I}(p)^2}$$

and the gradient direction: $\Theta(p) = \operatorname{atan}(\nabla_y \tilde{I}(p) / \nabla_x \tilde{I}(p))$. Both the gradient magnitude and the gradient direction are utilized to obtain the correspondence cost.

3.2.3 Correspondence Cost

The correspondence cost aims to measure the similarity of corresponding pixels. As previously discussed, for H-LF stereo matching, we first need to develop a spectral-invariant feature descriptor.

Considering two pixels p, q and their corresponding adjacent pixels p', q', if p, q and p', q' lie inside a same object, their relation satisfies:

$$|\tilde{I}_L(p) - \tilde{I}_L(p')| \simeq |\tilde{I}_R(q) - \tilde{I}_R(q')|$$

Here, adjacent pixels refer to pixels in adjacent H-LF views. This relation indicates the magnitude $M(p)$ and direction $\Theta(p)$ should be approximately the same. i.e., $M_L(p) \simeq M_R(q)$ and $\Theta_L(p) \simeq \Theta_R(q)$. On the contrary, if the pixels lie near an edge, the pixel p may lie on a foreground and the pixel q may lie on a background. The foreground pixel p and the background pixel q may correspond to an object with different spectral responses. Accordingly, the magnitude measure is no longer consistent, however, the directions should still be similar. In other words, when pixels p and q lie near an edge, $M_L(p) \simeq M_R(q)$ and $\Theta_L(p) \neq \Theta_R(q)$.

Figure 4B:
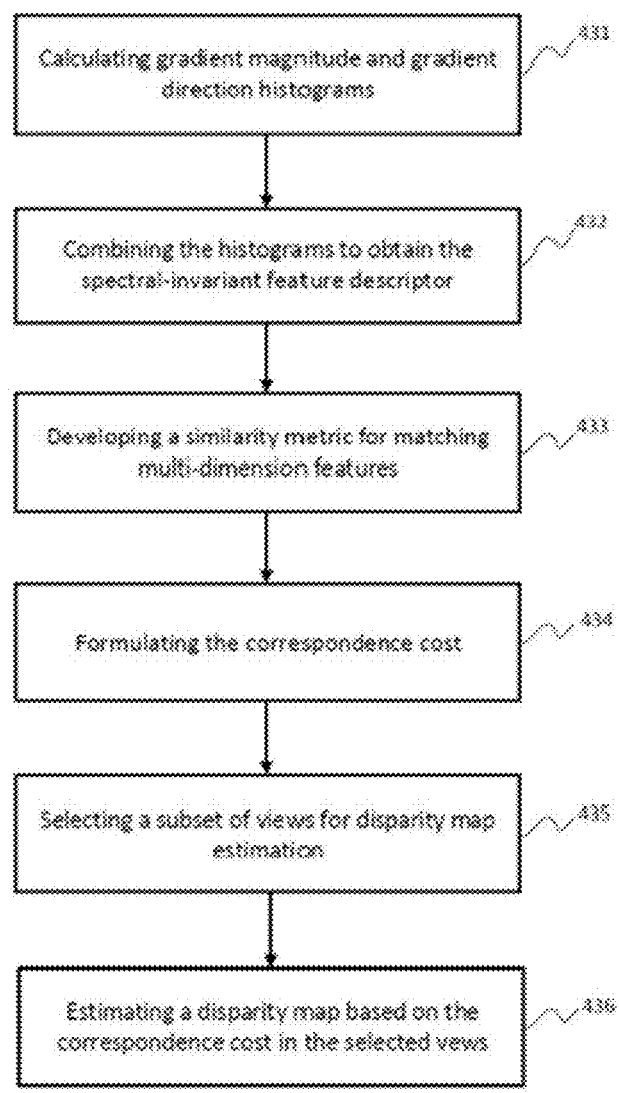
FIG. 4B is a flow diagram illustrating a method for estimating a disparity map based on a correspondence cost, consistent with exemplary embodiments of the present disclosure.

Therefore, a new spectral-invariant feature descriptor is developed to measure both edge and non-edge features. Specifically, the non-edge features can be described by coupling the magnitude and direction histograms whereas the edge features can be described with an extension of histogram of oriented gradient (HoG) which is called Overlapping HoG or O-HoG. Overlapping refers that each bin in O-HoG contains overlapping ranges of directions. A histogram is a graphical representation of the distribution of numerical data. It is an estimate of the probability distribution of a continuous variable (quantitative variable). It is a kind of bar graph. To construct a histogram, the first step is to "bin" the range of values—that is, divide the entire range of values into a series of intervals—and then count how many values fall into each interval. As for the HLFI system, any slight change in perspective or spectrum may lead to a misalignment in HoG, whereas O-HoG is much more robust in handling view and spectral variations. Therefore, the spectral-invariant feature descriptor is designed to enclose O-HoG. The detailed method for developing the spectral-invariant feature descriptor can be explained in the following discussion, and is illustrated in FIG. 4B in accordance to exemplary embodiments of the present disclosure.

At step 431, the magnitude and direction histograms are calculated. Given a patch of pixels $U(p, w) \in \mathbb{N}^{w^2 \times 2}$ centered at p with size $w \times w$, weighted votes for bins of the magnitude histogram $h_1(p, w, K_1)$ and direction histogram $h_2(p, w, K_2)$ can be counted, where $K_1$, $K_2$ are the total level of magnitude and direction bins respectively. The k-th bin $b_i^{(k)}(p, w)$ of $h_i$ ($i=1,2$; $k \in [0, K_i-1)$) can be constructed as:

$$b_i^{(k)}(p, w) = \frac{\sum_{u_t \in U(p,w)} G(p, u_t, \sigma_g) f(u_t)}{\sum_{j \in [0, K_i-1]} b_i^{(j)}} \quad (1)$$

Similarly, for the O-HoG term $h_3(p, w, K_3)$, the k-th bin $b_3^{(k)}(p, w)$ can be computed as:

$$b_3^{(k)}(p, w) = \frac{\sum_{u_t \in U(p,w)} G(p, u_t, \sigma_g) M(u_t) f(u_t)}{\sum_{j \in [0, K_i-1]} b_3^{(j)}} \quad (2)$$

where $G(p, u_t, \sigma_g) = \exp(-\|p - u_t\|_2^2 / 2\sigma_g^2)$ is a spatial weight kernel, and $f(u_t)$ is a truncation function as:

$$f(u_t) = \begin{cases} 1 & Q(u_t) \in [k(1-o)s, k(1-o)s + s] \\ 0 & \text{else} \end{cases} \quad (3)$$

Here o is the overlapping portion between the neighboring bins and s is the width of bin. In $h_1$, $Q(u_t) = M(u_t)$, otherwise, $Q(u_t) = \Theta(u_t)$. Equations (1)-(3) build completed feature descriptor terms for each pixel. Equations (1) and (2) are two independent parts from two attributes: the edge and non-edge features. Equation (3) serves both Equations (1) and (2) as a function term.

At step 432, all three histograms can be combined by using a weight matrix $\alpha = [\alpha_1, \alpha_2, \alpha_3]^T$. As mentioned above, $h_1$ and $h_2$ represent non-edge features and $h_3$ represents edge features. Since $M(p)$ intrinsically represents the edge strength of p, $M(p)$ can be reused to compute: $\alpha_1 = \alpha_2 = \beta \exp(-M^2(p)/\sigma_w)$ and $\alpha_3 = 1 - \alpha_1 - \alpha_2$ with $\beta \in (0, \frac{1}{2}]$. The descriptor is formulated as $D_p = [\alpha_1 h_1^T, \alpha_2 h_2^T, \alpha_3 h_3^T]^T$. To further improve robustness, a pyramid structure can be built with a different patch $w = [w_1, w_2, w_3]^T$ to obtain the desired spectral-invariant feature descriptor as following:

$$H_p = [D_p^T(w_1), D_p^T(w_2), D_p^T(w_3)]^T \text{ with } K \text{ levels.}$$

Figure 5:
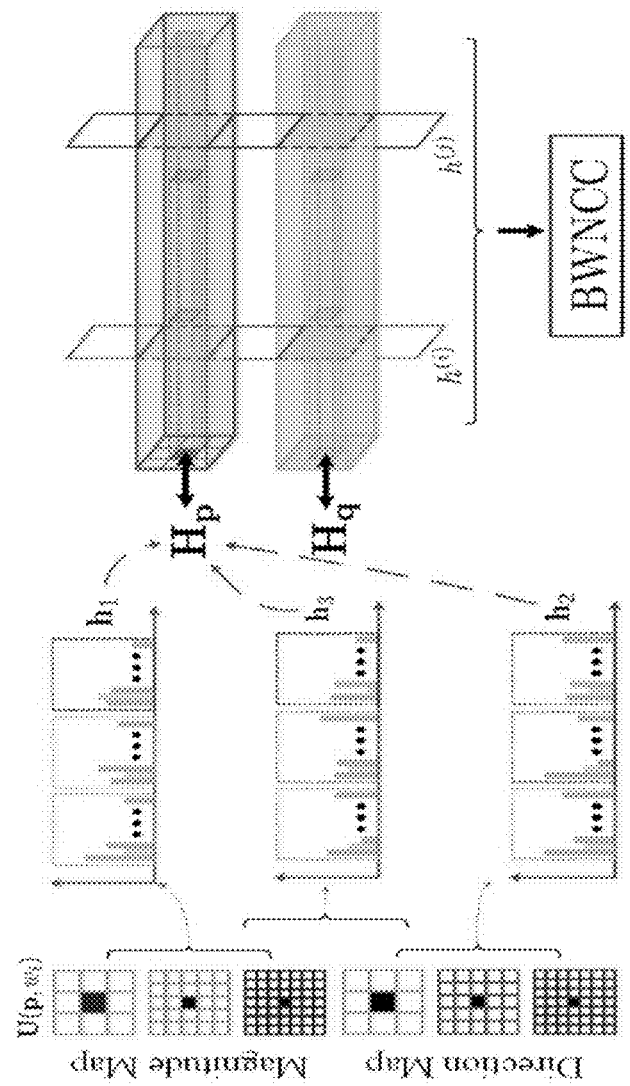
FIG. 5 is a graphical representation illustrating a structure of a feature descriptor, consistent with exemplary embodiments of the present disclosure.

FIG. 5 is a graphical representation illustrating a structure of an exemplary spectral-invariant feature descriptor, in accordance to the embodiments of the present disclosure.

Having obtained the spectral-invariant feature descriptor, the next step is to compare the spectral-invariant feature descriptor in different views, i.e., measuring similarities in different H-LF images. One commonly adopted similarity measurement algorithm in stereo matching is normalized cross correlation (NCC), and the corresponding correlation coefficient is shown as following:

$$\xi(I) = \frac{\sum_{\substack{u_i \in U_L \\ u_j \in U_R}} (I_L(u_i) - \bar{I}_L)(I_R(u_j) - \bar{I}_R)}{\sqrt{\sum_{u_i \in U_L} (I_L(u_i) - \bar{I}_L)^2 \sum_{u_j \in U_R} (I_R(u_j) - \bar{I}_R)^2}} \quad (4)$$

where $\bar{I}_L$ and $\bar{I}_R$ are the mean values of $U_L(p, w)$ and $U_R(q, w)$ respectively in the domain I (e.g., intensity). However, NCC is not directly applicable for matching multi-dimensional features. The spectral-invariant feature descriptor H is multi-dimensional, however, each $h^{(i)}$ in H is independent of any other element $h^{(j)}$ ($j \neq i$) and represents a unique attribute of H (as shown in FIG. 5).

At step 433, a similarity metric for matching multi-dimensional features can be developed. Equation (4) can be used with appropriate weight for each $h^{(i)}$, and we can obtain a similarity metric as $$\xi(H) = \sum_{i=0}^{K-1} \omega_i \xi(h^{(i)}).$$

Here, $w_i$ is a similarity weight of $h^{(i)}$. Since the value of $h^{(i)}$ can reflect the weight of the i-th histogram and the value of $h^{(i)}$ has been normalized to have a range of [0, 1], $h^{(i)}$ can be used to substitute for $w_i$. In addition, to suppress noise, the mean values $\bar{h}^{(i)}$ are used instead of $h^{(i)}$ as the weights.

Moreover, since $h_p^{(i)}$ and $h_q^{(i)}$ play equally important roles in computing $\xi(H)$, the similarity metric can adopt a bidirectional weighted normalized cross correlation (BWNCC), and we can get a final similarity metric shown as the following:

$$\xi_{bwncc}(H) = \left( \sum_{i=0}^{K-1} \xi(h^{(i)}) \bar{h}_p^{(i)} \sum_{j=0}^{K-1} \xi(h^{(j)}) \bar{h}_q^{(j)} \right)^{0.5}$$

The forward component weighted by $\bar{h}_p^{(i)}$ represents the similarity between $h_p^{(i)}$ and $h_q^{(i)}$, and the backward components weighted by $\bar{h}_q^{(i)}$ represent the similarity between $h_q^{(i)}$ and $h_p^{(i)}$.

At step 434, the correspondence cost can be formulated. Given a hypothesis disparity $f(p)$, the correspondence cost can be formulated by using the spectral-invariant feature descriptor and the similarity metric as:

$$C(p, f(p)) = \frac{1}{|\Omega^*|} \sum_{(s,t) \in \Omega^*} -\log(\xi_{bwncc}(H))$$

At step 435, a subset of views are selected for the disparity estimation. Each H-LF image captured at a different position includes a different LF view. All views can be denoted as $\Omega$, the reference view (positioned at {3,4}) is denoted as $(s_o, t_o)$, and $\Omega^*$ is a subset of $\Omega$ which is selected for the disparity estimation.

Instead of matching P in $(s_o, t_o)$ with pixel q in all LF views according to a hypothesis disparity map $f(p)$, we only performing the matching in a selected subset of views $\Omega^*$ with a coherent appearance. To select a proper subset of views, we first compute the mean gradient magnitude of q in all views, denoted as $\overline{M(q)}$. Next, we determine if P's gradient magnitude, denoted as $M(p)$ is above or below the mean gradient magnitude of q. If $M(p) > \overline{M(q)}$, then it implies that P is an edge pixel. Then we only select the views in which pixels q has a higher gradient magnitude than $\overline{M(q)}$. On the other hand, if $M(p) < \overline{M(q)}$, it implies p is a non-edge point. Then we only select the views in which pixels q with a lower gradient magnitude than $\overline{M(q)}$ for the disparity estimation.

At step 436, an initial disparity map of the reference view, $f_c^*$, can be estimated based on the correspondence cost in the subset of selected views by separately treating occluding vs.

non-occluding pixels by using an occlusion-aware depth estimation method from Ting-Chun Wang, et al. (T. Wang, et al., "Occlusion-aware Depth Estimation Using Light-field Cameras", *IEEE International Conference on Computer Vision*, 2015). A non-occluded pixel refers to a pixel that can be covered by all view rays in the scene if the rays are refocused to the correct depth. On the contrary, an occluded pixel refers to a pixel that some view rays hit an occluder and are not able to cover the pixel.

If P is non-occluding, we have $f_c^*(p)=\min_f\{C\}$. If p is occluding, we can partition $\Omega^*$ into an occluder vs. an occluded region, denoted as $\Omega^*_1$ and $\Omega^*_2$. Then the correspondence cost $C_1$ and $C_2$ for the respective $\Omega^*_1$ and $\Omega^*_2$ can be computed by using Ting-Chun Wang's method, and an initial disparity map can be obtained as: $f^*_c(p)=\min_f\{C_1,C_2\}$ for an occluding pixel. At the end of the step 430, the correspondence cost unit 321 outputs an estimated disparity map based on the correspondence cost.

3.2.4. Defocus Cost

The correspondence cost is to measure appearance consistency, while the defocus cost is to measure the unreliable color/intensity variance. All pixels in the H-LF images are spectral-aware samplings, reflecting the values from different spectra for any single 3D point. To address the effect of the spectra, a new spectrum-aware defocus cost is developed at step 440 in the defocus cost unit 322, as illustrated in FIG. 6, consistent with exemplary embodiments of the present disclosure.

Given a hypothesis disparity f(p), the RGB color of a pixel p in a canonical camera can be estimated. As shown in FIG. 6, block (a), a spectral profile of p as $P_p(\lambda)$ can be formed by indexing $\lambda_{(s,t)}$ using $I_p(s, t)$ into respective views. Then the spectral profile is used to synthesize the RGB value, as shown in FIG. 6, block (b). Given a 3D point, all the pixels reflecting the values of the point in different spectra can compose a curve, which is the spectral response of this 3D point. In some embodiments, a spectral response function of a PTGrey FL3-U3-20E4C-C camera, $P_c(\lambda)=[P_r(\lambda), P_g(\lambda), P_b(\lambda)]^T$, can be used to obtain the RGB value by integrating $P_p(\lambda_{(s,t)})$ with $P_c(\lambda_{(s,t)})$ over the respective bandwidths. In some embodiments, the 30 spectrum bands cover the visible spectrum range from 410 nm to 700 nm with intervals of 10 nm.

Figure 6:
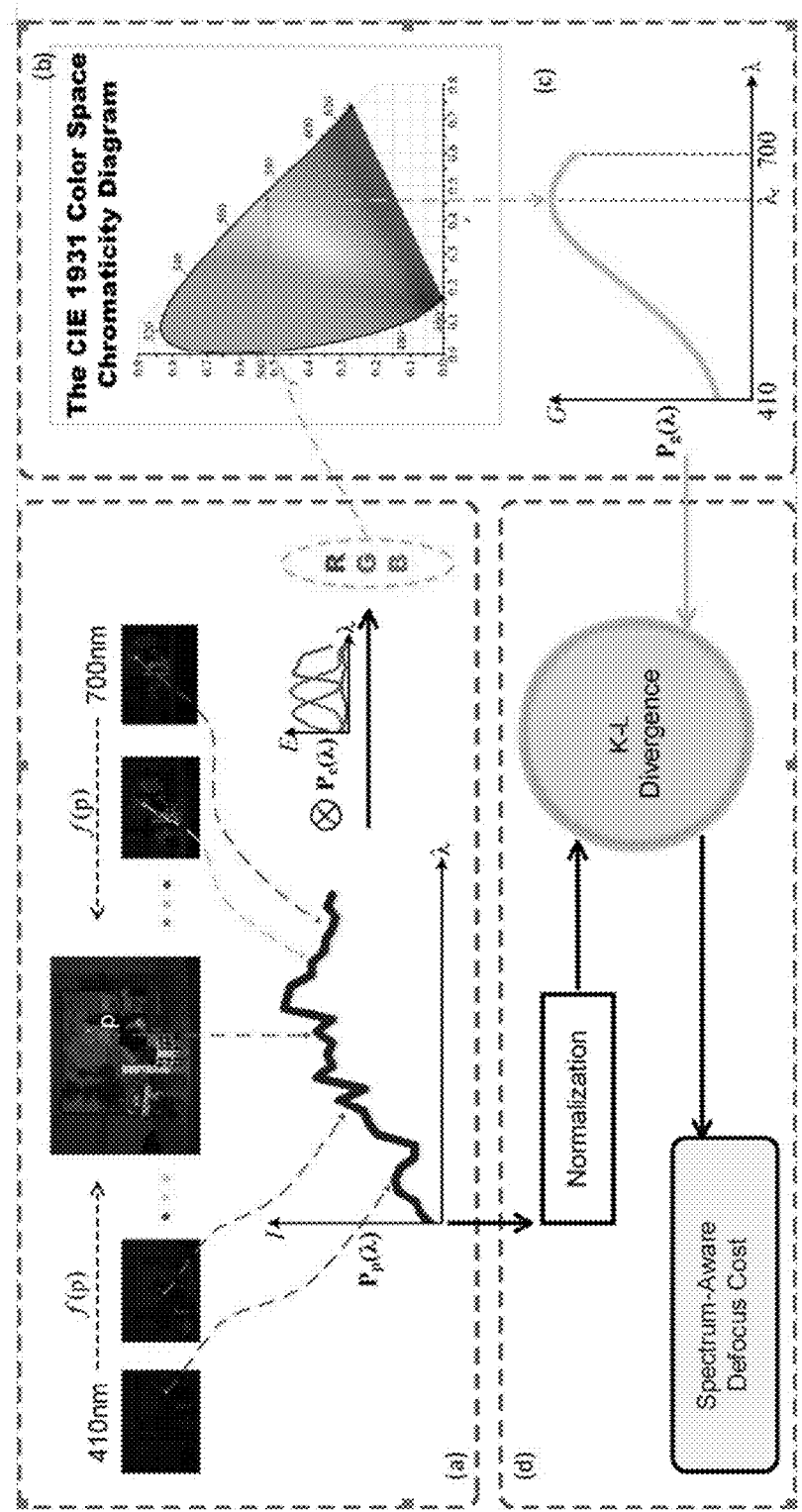
FIG. 6 illustrates a method for obtaining a defocus cost, consistent with exemplary embodiments of the present disclosure.

Then, the RGB color value can be mapped back to spectra $\lambda_r$ in a CIE 1931 Color Space, as shown in FIG. 6, block (c), by using a technique of a visible gamut with the RGB's hue from the CIE 1931 Color Space (T. Smith and J. Guild, "The C.I.E. colorimetric standards and their use", Transactions of the Optical Society, vol. 33, 73.) The CIE 1931 color spaces are the first defined quantitative links between physical pure colors (i.e. wavelengths) in the electromagnetic visible spectrum, and physiological perceived colors in human color vision. The mathematical relationships that define these color spaces are essential tools for color management, important when dealing with color inks, illuminated displays, and recording devices such as digital cameras.

FIG. 6, block (c) shows a Gaussian distribution of the captured spectra of the sampled H-LF images. Since a correct disparity hypothesis results in an accurate estimation of the RGB value, the sampled H-LF images should have the captured spectra approximately form a Gaussian distribution centered at $\lambda_r$, with a probability density function as:

$$P_g(\lambda) = 1/\sigma_d \sqrt{2\pi} \cdot \exp(-(\lambda - \lambda_r)^2 / 2\sigma_d^2) \qquad (5)$$

The probability density function can be normalized as:

$$P_p(\lambda) \text{ to } P_p^*(\lambda) = P_p(\lambda)/\Sigma_{(s,t)\in\Omega} P_p(\lambda_{(s,t)}).$$

In addition, a Kullback-Leibler divergence can be measured from $P^*_p(\lambda)$ to $P_g(\lambda)$, as shown in FIG. 6, block (d). The Kullback—Leibler divergence is a measure of how one probability distribution diverges from a second expected probability distribution. The comparison between the estimated spectra $\lambda_r$, and the captured spectra of the sampled H-LF images indicates the level of focusness. The defocus cost can be computed as:

$$D(p, f(p)) = \sum_{(s,t)\in\Omega} P_g(\lambda_{(s,t)}) \log \frac{P_g(\lambda_{(s,t)})}{P_p^*(\lambda_{(s,t)})} \qquad (6)$$

In some embodiments, the value of $\sigma_d$ is selected to guarantee $P_g(\lambda)$ to have at least 30% of response in bordering of visible spectrum (i.e., 410 nm or 700 nm). For example, if $\lambda_r=550$ nm, we may select $\sigma_d=96.5$. At the end of step 440, the defocus cost unit 322 outputs another estimated disparity map based on the defocus cost: $f^*_d(p)=\min_f\{D\}$.

3.2.5 Energy Minimization

The obtained the estimated disparity maps from both the correspondence cost and the defocus cost are transmitted to the energy minimization unit 323 to obtain an optimal disparity map of the reference view. At step 450, an energy function with a Markov random field (MRF) on a hypothesis disparity f can be constructed as:

$$E(f)=E_{unary}(f)+E_{binary}(f) \qquad (7)$$

Here, MRF refers to a Markov random field, Markov network or undirected graphical model. It is a set of random variables having a Markov property described by an undirected graph. The binary term $E_{binary}(f)$ is an energy term for smoothness and occlusion, and is developed by Ting-Chun Wang, et al. (T. Wang, et al., "Occlusion-aware Depth Estimation Using Light-field Cameras", *IEEE International Conference on Computer Vision*, 2015). The unary term incorporates both the contributions from the correspondence cost and the defocus cost, and is defined as:

$$E_{unary}(f) \sum_p \gamma_c |C(f(p)) - C(f_c^*(p))| + |D(f(p)) - D(f_d^*(p))|$$

where $\gamma_c$ adjusts the weights between correspondence and defocus cost.

At step 460, by minimize the energy function (7), the optimal disparity map ft for the reference view can be obtained. The minimization of the energy function (7) can be solved by using a graph-cut algorithm. "Graph-cut" is a type of algorithm used to solve a variety of energy minimization problems which employ a max-flow/min-cut optimization.

The H-LF stereo matching method has the following advantages: 1. This method can accurately measure the similarity of correspondence points in images with different spectra. 2. It includes a new defocus cost to synthesize the RGB color from the sampled H-LF images and then use the CIE color Gamut to map the estimated hue of color to its spectral band and robustly measure its consistency with the spectra of the sampled H-LF images as the focusness measure.

3.3 Hyperspectral Data-cube Reconstruction

Figure 7:
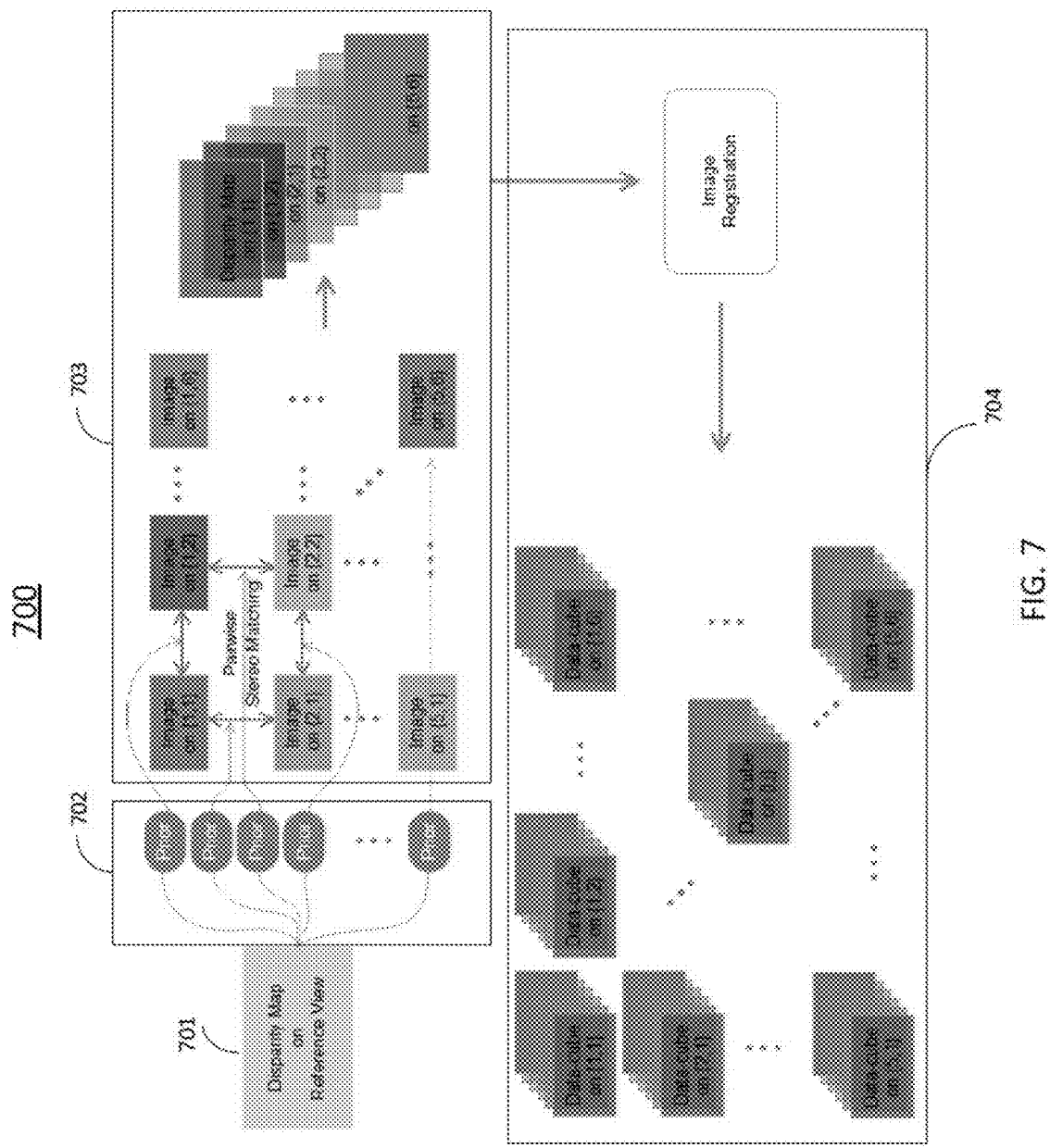
FIG. 7 is a flow diagram illustrating a method for H-LF data-cube reconstruction, consistent with exemplary embodiments of the present disclosure.

FIG. 7 is a flow diagram illustrating a method for H-LF data-cube reconstruction, in accordance to exemplary embodiments of the present disclosure. At step 701, the optimal disparity map of the reference view is input to the H-LF data-cube reconstruction unit 330 to generate complete H-LF data-cubes. At step 702, in the initial disparity estimation unit 331, the disparity map of the reference view is warped to individual H-LF images as an initial disparity estimation, generating a "prior" for each neighboring pair of images. At step 703, for each neighboring pair of images, a pairwise stereo matching is performed to generate pairwise disparity maps $f^\dagger_L$, $f^\dagger_R$, by utilizing the "prior" at the pairwise stereo matching unit 332. At step 704, we can map all pixels p on L to q on R according $f^\dagger_L$, and register all images currently on R to L (reverse implement should use $f^\dagger_R$, to eliminate artifacts) at the image registration unit 333. This process is iterated for all neighboring pairs, and the complete H-LF data-cubes can be obtained. The complete H-LF data-cubes include all 5×6 views, and 5×6×30 images where 30 is the number of sampled spectrum bands. The complete H-LF data-cubes cover the spectrum range from 410 to 700 nm with 30 bands each 10 nm wide.

The hyperspectral data-cube reconstruction method has the following advantages: 1. It overcomes the shortcoming of the brute-force approach. The brute-force approach directly warps images to the rest of views by using the disparity map of the reference view. The brute-force approach may cause substantial amount of holes due to occlusion and large baselines in the data capturing unit. 2. This method also fully exploits the properties of the light fields, compared to conducting pairwise stereo matching between all views.

The various modules, units, and components described above can be implemented as an Application Specific Integrated Circuit (ASIC); an electronic circuit; a combinational logic circuit; a field programmable gate array (FPGA); a processor (shared, dedicated, or group) that executes code; or other suitable hardware components that provide the described functionality. The processor can be a microprocessor provided by from Intel, or a mainframe computer provided by IBM.

Note that one or more of the functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A method of generating hyperspectral data-cubes based on a plurality of hyperspectral light field (H-LF) images, wherein each H-LF image comprises a different view and a different spectral band, the method comprising:
   calculating a magnitude histogram, a direction histogram, and an overlapping histogram of oriented gradient for a plurality of pixels, wherein a bin in the overlapping histogram of oriented gradient comprises overlapping ranges of directions;
   developing a spectral-invariant feature descriptor by combining the magnitude histogram, the direction histogram, and the overlapping histogram of oriented gradient;
   obtaining a correspondence cost of the H-LF images based on the spectral-invariable feature descriptor;
   performing H-LF stereo matching on the H-LF images to obtain a disparity map of a reference view; and
   generating hyperspectral data-cubes by using the disparity map of the reference view.

2. The method of claim 1, wherein the spectral-invariant feature descriptor measures both edge and non-edge features.

3. The method of claim 2, wherein the non-edge feature is described by coupling the magnitude histogram and the direction histogram, and the edge feature is described by the overlapping histogram of oriented gradient.

4. The method of claim 3, further comprising:
   combining the magnitude histogram, the direction histogram, and the overlapping histogram of oriented gradient using a weight matrix and a pyramid structure to form the spectral invariant feature descriptor.

5. The method of claim 1, further comprising:
   comparing the spectral-invariant feature descriptor to develop a similarity metric using a bidirectional weighted normalized cross correlation (BWNCC).

6. The method of claim 1, further comprising:
   obtaining an estimated spectra by synthesizing RGB color values from the H-LF images and mapping the RGB color values to a spectral band; and
   obtaining a defocus cost of the H-LF images based on a comparison between estimated spectra and captured spectra of the H-LF images.

7. The method of claim 6, wherein a Kullback-Leibler divergence is used in the comparison between the estimated spectra and the captured spectra of the H-LF images.

8. The method of claim 6, further comprising:
   performing H-LF stereo matching on the H-LF images to obtain the disparity map of the reference view based on the correspondence cost and the defocus cost.

9. The method of claim 1, further comprising:
   estimating an initial disparity map of the reference view based on the correspondence cost by treating occluding and non-occluding pixels separately.

10. The method of claim 1, further comprising:
    capturing the plurality of H-LF images by a plurality of multi-view hyperspectral data terminals placed in a rectangular array comprising a plurality of rows and a plurality of columns, wherein each terminal consists a monochrome camera and a narrow bandpass optical filter.

11. A method of generating hyperspectral data-cubes based on a plurality of hyperspectral light field (H-LF)

images, wherein each H-LF image comprises a different view and a different spectral band, the method comprising:
obtaining an estimated spectra by synthesizing RGB color values from the H-LF images and mapping the RGB color values to a spectral band;
obtaining a defocus cost of the H-LF images based on a comparison between estimated spectra and captured spectra of the H-LF images;
performing H-LF stereo matching on the H-LF images to obtain a disparity map of a reference view; and
generating hyperspectral data-cubes by using the disparity map of the reference view.

12. The method of claim 11, wherein a Kullback-Leibler divergence is used in the comparison between the estimated spectra and the captured spectra of the H-LF images.

13. The method of claim 12, further comprising:
performing H-LF stereo matching on the H-LF images to obtain the disparity map of the reference view based on the defocus cost.

14. The method of claim 13, further comprising:
calculating a magnitude histogram, a direction histogram, and an overlapping histogram of oriented gradient for the plurality of pixels, wherein a bin in the overlapping histogram of oriented gradient comprises overlapping ranges of directions;
developing a spectral-invariant feature descriptor by combining the magnitude histogram, the direction histogram, and the overlapping histogram of oriented gradient; and
obtaining a correspondence cost of the H-LF images based on the spectral-invariable feature descriptor.

15. The method of claim 14, wherein the spectral-invariant feature descriptor measures both edge and non-edge features.

16. The method of claim 15, wherein the non-edge feature is described by coupling the magnitude histogram and the direction histogram, and the edge feature is described by the overlapping histogram of oriented gradient.

17. The method of claim 16, further comprising:
combining the magnitude histogram, the direction histogram, and the overlapping histogram of oriented gradient using a weight matrix and a pyramid structure to form the spectral invariant feature descriptor.

18. The method of claim 13, further comprising:
comparing the spectral-invariant feature descriptor to develop a similarity metric using a bidirectional weighted normalized cross correlation (BWNCC).

19. The method of claim 11, further comprising:
estimating an initial disparity map of the reference view based on the correspondence cost by treating occluding and non-occluding pixels separately.

20. The method of claim 11, further comprising:
capturing the plurality of H-LF images by a plurality of multi-view hyperspectral data terminals placed in a rectangular array comprising a plurality of rows and a plurality of columns, wherein each terminal consists a monochrome camera and a narrow bandpass optical filter.

21. A hyperspectral light field imaging (HLFI) system for capturing hyperspectral light field (H-LF) images to generate hyperspectral data-cubes, the system comprising:
a plurality of multi-view hyperspectral data terminals configured to capture a plurality of H-LF images, wherein each H-LF image comprises a different view and a different spectral band; and
a data processing unit configured to:
calculate a magnitude histogram, a direction histogram, and an overlapping histogram of oriented gradient for a plurality of pixels, wherein a bin in the overlapping histogram of oriented gradient comprises overlapping ranges of directions;
develop a spectral-invariant feature descriptor by combining the magnitude histogram, the direction histogram, and the overlapping histogram of oriented gradient;
obtain a correspondence cost of the H-LF images based on the spectral-invariable feature descriptor;
perform H-LF stereo matching on the H-LF images to obtain a disparity map of a reference view; and
generate hyperspectral data-cubes by using the disparity map of the reference view.

22. The system of claim 21, wherein the data processing unit is configured to compare the spectral-invariant feature descriptor to develop a similarity metric using a bidirectional weighted normalized cross correlation (BWNCC).

23. The system of claim 21, wherein the data processing unit is configured to:
obtain an estimated spectra by synthesizing RGB color values from the H-LF images and mapping the RGB color values to a spectral band; and
obtain a defocus cost of the H-LF images based on a comparison between estimated spectra and captured spectra of the H-LF images.

* * * * *